United States Patent Office 3,307,940
Patented Mar. 7, 1967

3,307,940
ELECTROPHOTOGRAPHIC PROCESS EMPLOYING PHOTOCONDUCTIVE POLYMERS
Helmut Hoegl and Heinz Schlesinger, Wiesbaden, Germany, assignors, by mesne assignments, to Azoplate Corporation, Murray Hill, N.J.
No Drawing. Filed May 23, 1960, Ser. No. 30,747
Claims priority, application Germany, May 30, 1959, K 37,869
21 Claims. (Cl. 96—1)

In electrophotographic reproductions and recordings, inorganic materials such as selenium and zinc oxide have been utilized as photoconductive coatings. Certain organic substances of lower molecular weight, such as anthracene, chrysene and benzidine have also been used for these purposes.

Photoconductive coatings for electrophotography have now been found which are characterized in that they consist at least partially of a polymer of at least one N-substituted acrylic and/or α-alkyl-acrylic acid amide.

N-substituted polymeric acrylic acid amides and α-alkyl-acrylic acid amides of particular interest are those of the general formula

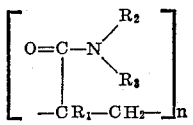

in which $R_1$ is hydrogen or a lower alkyl radical such as methyl, ethyl, propyl and butyl and $R_2$ is hydrogen or an aryl radical such as phenyl, diphenyl, naphthyl, pyrene, phenanthrene, indene, anthracene, perylene, fluorene, fluorenone and stilbene, or a substituted aryl radical, substituted by, e.g., groups such as lower alkyl, alkoxy, carbalkoxy, amino or substituted amino groups, or a heterocyclic radical such as quinoline, isoquinoline, indole, acridine, phenazone, carbazole, benzocarbazole, quinazoline, triazole, benztriazole, benzimidazole, pyrrole, thioacridine, or substitution products of these compounds, e.g. by alkyl, alkoxy, carbalkoxy, amino or substituted amino groups. Such compounds are, e.g., 3-dimethylaminocarbazole, 2-methoxycarbazole, 4'-tolyl-2-naphthylamine, 3 - methoxy - diphenylamine, 4-diethylamino-diphenylamine, and 2-(4'-diethylaminophenyl)-indole.

The radical $R_3$ is also an aryl, substituted aryl, heterocyclic or substituted heterocyclic radical as described under $R_2$ and it may be the same as or different from $R_2$. Also, it is possible for the radicals $R_2$ and $R_3$, together with the acid amide nitrogen, to form part of a heterocyclic or substituted heterocyclic radical. The following are exemplary: acridine, indole, α-phenylindole, pyrrole, and thioacridine. The $n$ in the general formula stands for a whole number greater than one. The preparation of the polymers of N-substituted acrylic and α-acrylic acid amides can be effected by the known processes of polymerization practice, e.g., block, dispersion and suspension polymerization, with the known radical formers such as peroxide or azo compounds as catalysts.

Exemplary of such compounds are the following:

FORMULA 1

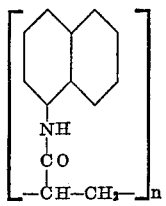

FORMULA 2

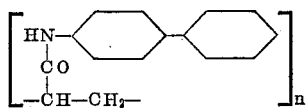

FORMULA 3

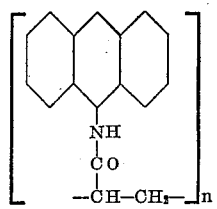

FORMULA 4

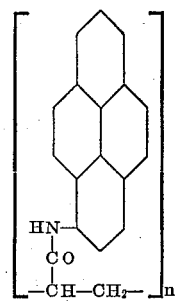

FORMULA 5

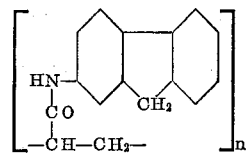

FORMULA 6

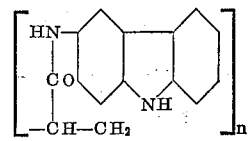

FORMULA 7

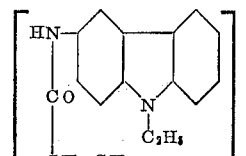

FORMULA 8

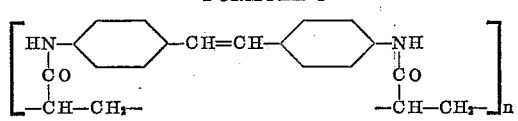

FORMULA 9

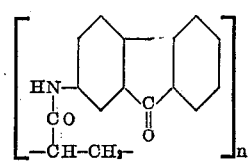

3,307,940
3
FORMULA 10
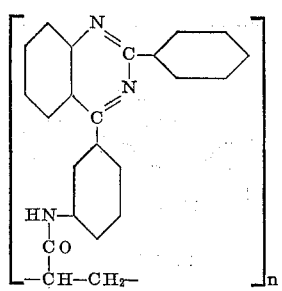
FORMULA 11
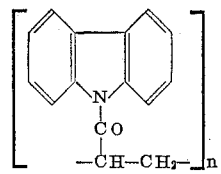
FORMULA 12
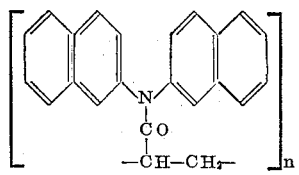
FORMULA 13
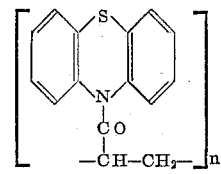
FORMULA 14
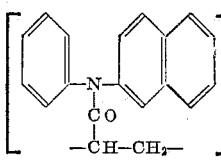
FORMULA 15
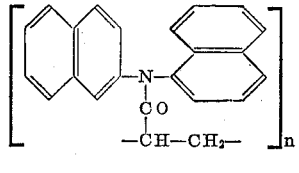
FORMULA 16
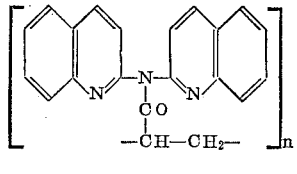
FORMULA 17
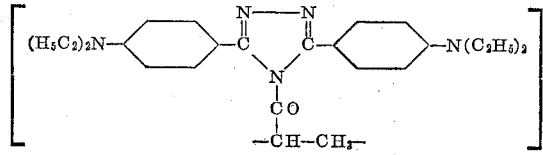
4
FORMULA 18
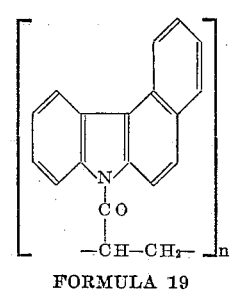
FORMULA 19
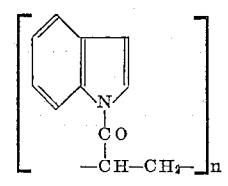
FORMULA 20
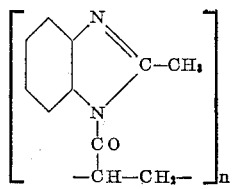
FORMULA 21
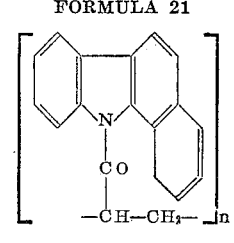
FORMULA 22
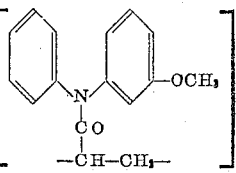
FORMULA 23
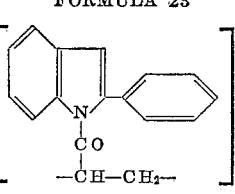
FORMULA 24
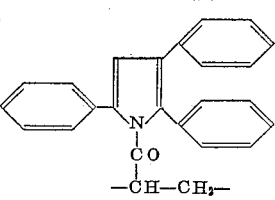
FORMULA 25
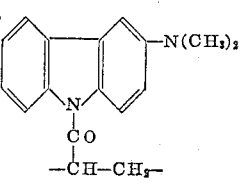

FORMULA 26

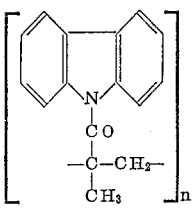

FORMULA 27

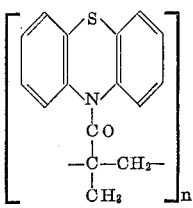

FORMULA 28

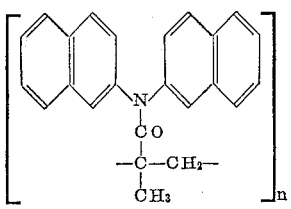

FORMULA 29

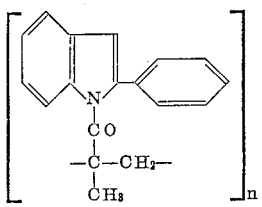

FORMULA 30

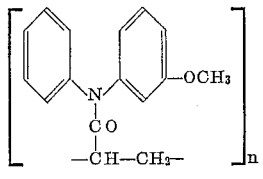

If the block polymerization process is used, the monomer is best melted and the radical-former, such as azo-iso-butyric acid dinitrile, is added thereto. When the reaction is completed, the polymer may be purified by solution in a solvent followed by reprecipitation (Method A).

The polymerization products of the N-substituted acrylic and α-acrylic acid amides can also be obtained if acrylic acid chloride or α-acrylic acid chlorides are reacted with a Grignard compound of secondary amines, the formation of the acid amides then being accompanied by polymerization (Method B).

According to the reaction conditions, i.e. temperature, solvent, and type and quantity of the catalyst used, polymers of varying degrees of polymerization can be prepared. Relatively highly polymeric compounds of this type are generally resin-like and can therefore be used without a binder as photoconductive coatings on supporting materials.

If more than one starting component is used, interpolymers also can be prepared by both of the methods described above (A and B).

The monomeric N-substituted acrylic and α-acrylic acid amides are prepared by the reaction of the appropriate acid chlorides, preferably in solvents, e.g., dioxane and tetrahydrofuran, with the corresponding amines.

For the use thereof as photoconductive coatings in electrophotography, the polymers described above are preferably applied to a support from organic solvents, e.g., the solution may be cast, painted or sprayed upon a support and the solvent is then evaporated. The products may also be applied from aqueous or non-aqueous dispersions. Examples of the supports used in electrophotography are metals, such as aluminum, zinc, and copper; cellulose products, such as paper and cellulose hydrate; plastics, such as polyvinyl alcohol, polyamides, and polyurethanes. Other plastics, such as cellulose acetate and cellulose butyrate, especially in a partially saponified form, polyesters, polycarbonates, and polyolefines, if they are covered with an electroconductive layer or if they are converted into materials which have the above-mentioned specific conductivity, e.g. by chemical treatment or by introduction of materials which render them electrically conductive, can also be used, as well as glass plates.

In general, a material is suitable if its specific resistance value is less than $10^{12}$ ohm cm., preferably less than $10^{10}$ ohm cm. This does not necessarily exclude the use in special cases of supports with a specific resistance higher than this, particularly with an apparatus which charges the electrophotographic plates on both sides, e.g. by double corona discharge as described in DAS. 1,030,183.

In general, however, materials having a relatively high conductivity are preferred. Also, the supporting material may be provided with an intermediate layer of good conductivity to which the photoconductive coating may be applied.

The fact that the N-substituted polyacrylic acid amides are photoconductive is surprising. This property makes them suitable for electrophotographic purposes. If they are present in a thin layer on one of the supports mentioned above and this layer is charged by corona discharge and the negatively or positively charged coating is then exposed to light under a master, preferably to long-wave ultra violet light of a wavelength of about 3,600 to 4,200 A., as transmitted by high-pressure mercury vapor lamps, the charge will be leaked away in the exposed parts after a very short exposure, while it will remain in the unexposed parts. Thus, very good electrostatic-charge images are obtained which, by powdering over with an oppositely charged pigmented powder, can be converted into visible images corresponding to the master. If the powder is fixed, e.g., by heating, permanent copies of the master can be obtained.

The sensitivity of the photoconductive coatings in the range of visible light can be increased by the addition of optical sensitizers, in particular dyestuffs. The exemplary dyestuffs listed below are accompanied by the page and item number under which they appear in Schultz' "Farbstofftabellen" (7th edition, 1931, 1st vol.).

Triarylmethane dyestuffs such as Brilliant Green (No. 760, p. 314), Victoria Blue B (No. 822, p. 347), Methyl Violet (No. 783, p. 327), Ethyl Violet (No. 787, p. 331), Crystal Violet (No. 785, p. 329), Acid Violet 6B (No. 831, p. 351); xanthene dyestuffs, namely rhodamines, such as Rhodamine B (No. 864, p. 365), Rhodamine 6G (No. 866, p. 366), Rhodamine G Extra (No. 865, p. 366), Sulphorhodamine B (No. 863, p. 364) and Fast Acid Eosin G (No. 870, p. 368), as also phthaleins such as Eosin S (No. 883, p. 376), Eosin A (No. 881, p. 374), Erythrosin (No. 886, p. 376), Phloxin (No. 890, p. 378), Bengal Rose (No. 889, p. 378), and Fluorescein (No. 880, p. 373); thiazine dyestuffs such as Methylene Blue (No. 1038, p. 447); acridine dyestuffs such as Acridine Yellow (No. 901, p. 383), Acridine Orange (No. 908, p. 387) and Trypaflavine (No. 906, p. 386), quinoline dyestuffs such as Pinacyanol (No. 924, p. 396) and Cryptocyanine (No. 927, p. 397); quinone dyestuffs and ketone dyestuffs such as Alizarin (No. 1141, p. 499), Alizarin Red S (No. 1145, p. 502), and Quinizarine (No. 1148, p. 504); cyanine dyestuffs, e.g., Cyanine (No. 921, p. 394) and chlorophyll.

Further, a general increase in light-sensitivity is obtained if small quantities of activators such as those described in application Serial Number 30,752, filed May 23, 1960, now abandoned (corresponding to German application K 37,853, IVa/57b, filed May 29, 1959) are added. The following are examples of activators acting as electron acceptors that are of interest: 1,2-dibromo-maleic-anhydride, chloranil, dichloro-acetic acid, 1,2-benz-anthraquinone, 2,4,7-trinitrofluorenone, 1,3,5-trinitro-benzene, tetrachlor-phthalic-anhydride, hexabrom-naphthtalic anhydride. Very generally, the substances normally classified in the literature as Lewis acids are suitable. A definition of Lewis acids is given in Kortum's "Lehrbuch der Elektro-chemie," 1948 edition, p. 300.

Other additives, such as plasticizers, resins, e.g., ketone resins, or pigments, e.g., zinc oxide or titanium dioxide may be included in the photoconductive coatings.

For the production of electrophotographic images, the photoconductive coating is charged, positively or negatively, by means of a corona discharge of some thousands of volts; it is then exposed to light under a master. Alternatively, an episcopic or diascopic image is projected thereon. The invisible electrostatic latent image thus produced is developed with a pigmented resin powder. The now visible, colored image may be fixed by heating to temperatures at which the resin used melts, i.e., 100–150° C. preferably 110–125° C.; the heating can advantageously be done by means of infrared radiation. The fixing temperature may be less if the material is simultaneously subjected to the action of vapors of materials which are capable of dissolving or swelling the resins in question. In addition to water, the compounds primarily useful are halogenated hydrocarbons, such as trichloroethylene or carbon tetrachloride, or saturated lower alcohols such as ethanol and propanol. By the method described above, images corresponding to the master with good contrast are obtained. These can be used for the preparation of printing plates. For this purpose, the images are wiped over with a suitable solvent, wetted with water and linked up with greasy ink. In this way, printing plates corresponding to the master can be obtained from which copies can be made on an offset printing machine.

If transparent supporting material is used for the photoconductive coatings, the electrophotographic images can also be used as masters for the production of additional copies on any type of light-sensitive sheets.

The photoconductive coatings described above find application not only in reproduction processes but also for recording purposes in measuring processes, e.g., for photographic recording instruments.

The photoconductive coatings in accordance with the process in question have the advantage that impregnation of paper supports against the penetration of solvents is not necessary. The photoconductive coatings in question may be applied in the form of solutions in organic solvents even to untreated base paper because the coating solution does not penetrate to any considerable extent. If transparent supporting material is used with the process in question, images corresponding to the master can be obtained on clear ground. These are excellently suited for further copying by any desired process. With the known materials, such as selenium or zinc oxide, the background has a certain cloudiness, so that unsatisfactory results are obtained if the material is used for further copying.

The methods used for the preparation of the polymers of the N-substituted acrylic and α-alkyl acrylic acid amides are illustrated below by an example. The other compounds of this class can be prepared in the same manner. The necessary variations in the experimental conditions, e.g., different quantities of solvent according to differing solubility and different quantities of catalyst, are matters within the knowledge possessed by those skilled in the art.

*Example 1a*

For the preparation of the polymeric N-(naphthyl-(1))-acrylic acid amide corresponding to Formula 1 in accordance with Method A, 13 parts by weight of N-naphthyl-(1)-acrylic acid amide are melted, preferably by means of a heating bath, and 0.02 part by weight of azo-isobutyric acid dinitrile is added thereto with stirring. In general, polymerization takes several hours, e.g., 2–20 hours. According to the reaction conditions employed, however, the polymerization process can be concluded in a matter of minutes, i.e., from about 15–30 minutes to about 2 hours. The reaction mixture can then be brought to a solid or semi-solid substance, particularly if the preparation is effected in the absence of a solvent. The polymer can, however, also be obtained in powder form if the polymerization process takes place in the presence of solvents. The polymer may be purified by solution in methylene chloride and reprecipitation with petroleum ether. The polymer thus obtained is in the form of a practically colorless powder which begins to melt at about 125° C. In general, the softening point for the polymeric products is from over 100° C. to about 300° C.; in some cases, however, it is over 300° C.

*Example 1b*

For the preparation of the N-substituted polyacrylic acid amides, for which secondary amines are the starting materials, Method B is primarily used. The polymeric N-(carbazolyl-(9))-acrylic acid amide is obtained as follows. Ethyl magnesium bromide is prepared from 5.3 parts by weight of magnesium and 24 parts by weight of ethyl bromide in 200 parts by volume of absolute ether. A suspension of 33.4 parts by weight of carbazole in 120 parts by volume of absolute benzene is added thereto and the homogeneous solution thereby obtained is heated for about one hour under reflux. It is then allowed to cool and 18.2 parts by weight of acrylic acid chloride dissolved in 30 parts by volume of absolute ether are added gradually thereto. Stirring is continued for two hours at room temperature. The polymeric reaction product separates out, is filtered off, washed with water and dried. It can be purified by reprecipitation, e.g., from methylene chloride/petroleum ether. The reaction product is in the form of a light yellow powder which softens at about 180 to 210° C.

*Example 1c*

For the preparation of the monomeric N-substituted acrylic and α-alkyl acrylic acid amides, e.g., a solution of 12 parts by weight of 1-naphthyl-amine in 20 parts by volume of dioxane is cooled in an ice bath and with stirring, 5.9 parts by volume of acrylic acid chloride are introduced dropwise, stirring being continued for about 15 minutes, during which time the reaction product separates out. The reaction solution is made alkaline by the addition of sodium carbonate, allowed to stand for several hours and is then crystallized from ethanol. The N-naphthyl-(1))-acrylic acid amide thus obtained forms colorless crystals which melt at 143° C.

In the following Table I, compounds are listed which were prepared by the methods described above.

In this table, column 1 gives the number under which the compounds appear in the above list of formulae. Column 2 gives the acid chloride used and column 3 the amino compound used. Column 4 indicates whether Method A or Method B is employed. Column 5 gives the melting point of the monomeric compounds obtained.

TABLE I

| 1 | 2 | 3 | 4 | 5 |
|---|---|---|---|---|
|   |   |   |   | ° C. |
| 1 | Acrylic acid chloride | 1-naphthylamine | A | 143 |
| 2 | ...do... | 4-aminodiphenyl | A | 146 |
| 3 | ...do... | 9-aminoanthracene | A | 154 |
| 4 | ...do... | 3-aminopyrene | A | 231–232 |
| 5 | ...do... | 2-aminofluorene | A | 176 |
| 6 | ...do... | 3-aminocarbazole | A | 210–211 |
| 7 | ...do... | 3-amino-9-ethylcarbazole | A | 179 |
| 8 | ...do... | 4,4′-diaminostilbene | A | 360 |
| 9 | ...do... | 2-aminofluorenone | A | 217 |
| 10 | ...do... | 4-(3′-aminophenyl)-2-phenylquinazoline | A | 161 |
| 11 | ...do... | Carbazole | B |   |
| 12 | ...do... | 2,2′-dinaphthylamine | B |   |
| 13 | ...do... | Thiodiphenylamine | B |   |
| 14 | ...do... | Phenyl-2-naphthylamine | B |   |
| 15 | ...do... | 1,2′-dinaphthylamine | B |   |
| 16 | ...do... | 2,2′-diquinolylamine | B |   |
| 17 | ...do... | 2,4-bis-(4′-diethylaminophenyl)-1,3,4-triazole | B |   |
| 18 | ...do... | 3,4-benzocarbazole | B |   |
| 19 | ...do... | Indole | B |   |
| 20 | ...do... | 2-methylbenzimidazole | B |   |
| 21 | ...do... | 1,2-benzocarbazole | B |   |
| 22 | ...do... | 3-methoxydiphenylamine | B |   |
| 23 | ...do... | 2-phenylindole | B |   |
| 24 | ...do... | 2,3,5-triphenylpyrrole | B |   |
| 25 | ...do... | 3-dimethylaminocarbazole | B |   |
| 26 | Methacrylic acid chloride | Carbazole | B |   |
| 27 | ...do... | Thiodiphenylamine | B |   |
| 28 | ...do... | 2,2′-dinaphthylamine | B |   |
| 29 | ...do... | 2-phenylindole | B |   |
| 30 | ...do... | 3-methoxydiphenylamine | B |   |
|   | Acrylic acid chloride | Carbazole plus 2,2′-dinaphthylamine (1:1) | B |   |

*Example 2*

0.75 part by weight of poly-N-(carbazolyl-(3))-acrylic acid amide corresponding to Formula 6 is dissolved in 15 parts by volume of methyl glycol and the solution is applied to a superficially roughened aluminum surface. After the evaporation of the solvent, a coating remains which adheres firmly to the surface of the foil. With the aluminum foil thus coated, a direct image is produced by the electrophotographic process. The dry coating is given a negative electric charge via a corona discharge produced by a charging apparatus maintained at about 6000 volts and is then exposed under a master to the light of a high-pressure mercury vapor lamp (125 watt). It is dusted over in known manner with a developer consisting of tiny glass balls and a very finely divided resin-carbon black mixture, the so-called toner. The black pigmented resin adheres to the parts of the coating not struck by light during the exposure and an image corresponding to the master becomes visible. It is fixed by slight heating.

The developer used as above consists of 100 parts by weight of glass balls of a grain size of 350–400μ and 2.5 parts by weight of a toner of a grain size of 20–50μ. The toner is prepared from 30 parts by weight of polystyrene, 30 parts by weight of modified maleic acid resin (e.g. Beckacite K–105) and 3 parts by weight of carbon black (e.g., Peerless Black Russ 552). These products are melted together and the melt is ground and then screened.

*Example 3*

6 parts by weight of a modified polyindene resin (e.g. Gebagenharz J/80) are dissolved in 90 parts by volume of glycol monoethylether. Six parts by weight of poly-N-(diphenylyl-(4))-acrylic acid amide, corresponding to Formula 2, are added to this solution and the suspension thus formed is finely ground in a colloid mill. This suspension is mechanically coated upon paper pretreated against the penetration of organic solvents and dried. With the paper thus coated, electrophotographic images are prepared by the process described in Example 1. Approximately equivalent results are obtained if the compound corresponding to Formula 2 is replaced by the same quantities of the polyacrylic acid amides from 4,4′-diamino-stilbene and acrylic acid chloride corresponding to Formula 8.

*Example 4*

0.75 part by weight of the compound corresponding to Formula 11 is dissolved in 15 parts by volume of benzene and this solution is applied to an aluminum foil. By means of the procedure described in Example 1, a very good background-free image can be obtained with an exposure time of two seconds.

*Example 5*

A solution of 0.005 part by weight of Rhodamine B extra in 0.5 part by volume of methanol is added to a solution containing 10 parts by weight of the compound corresponding to Formula 11, and 0.175 part by weight of dichloro-acetic acid to 100 parts by volume of methyl-ethyl-ketone. This solution is applied to paper and dried. Upon the paper coated in this way, direct images are produced by the electrophotographic process. The material is exposed under a master to the light of a 100-watt incandescent lamp for 15 seconds at a distance of about 40 cm. and then dusted over with a resin powder pigmented with carbon black. The image corresponding to the master thus obtained is slightly heated and thereby made permanent.

*Example 6*

A solution containing 10 parts by weight of the compound corresponding to Formula 11 to 100 parts by volume of methyl-ethyl-ketone is applied to transparent paper. After evaporation of the solvent, the resin coating adheres firmly to the surface of the foil. On the coated foil, electrophotographic images can be prepared in the manner described in Example 1. The exposure time, when the material is exposed under a master to a 125-watt high-pressure mercury vapor lamp at a distance of about 30 cm., is about 2 seconds. The fixed images are suitable as reproduction masters for the preparation of copies on any type of light-sensitive sheets.

*Example 7*

0.75 part by weight of the compound corresponding to Formula 12 is dissolved in 15 parts by volume of methyl glycol and the solution is applied to an aluminum foil. After the solvent has evaporated, a coating remains which adheres firmly to the surface of the foil. Images can be prepared from masters electrophotographically in known manner. The exposure time is 10 seconds, provided the conditions are otherwise the same as in Example 1.

*Example 8*

0.75 part by weight of the compound corresponding to Formula 14 is dissolved in 15 parts by volume of methyl glycol, and the solution is applied to an aluminum foil superficially roughened by brushing. After the solvent has evaporated, the polymerization product adheres firmly to the aluminum foil. Images can be produced electrophotographically as described in Example 1. If the material is exposed under a transparent master to the light of a 125-watt high-pressure mercury vapor lamp at a distance of about 30 cm., the exposure time is about 10 seconds. Very good background-free images are obtained, from which paper prints with good contrast effect are obtained by the transfer process.

*Example 9*

0.75 part by weight of the compound corresponding to Formula 17 is dissolved in 15 parts by volume of glycol monomethylether, and the solution is applied to an aluminum foil. After the coating has been dried, the foil is negatively charged by a corona discharge and exposed for about 0.5 second under a master to the light of a 100-watt incandescent lamp at a distance of about 30 cm. It is then dusted over with a resin powder pigmented with carbon black. The image, corresponding to the master, which now becomes visible is fixed by heating.

*Example 10*

0.75 part by weight of the compound corresponding to Formula 18 is dissolved in 15 parts by volume of glycol monomethylether, and the solution is coated upon an aluminum foil. Further procedure is as described in Example 1, a latent electrostatic image being obtained with an exposure of about 5 seconds to a 125-watt high-pressure mercury vapor lamp at a distance of about 30 cm. It is made visible with a developer powder, as previously described, and then fixed.

*Example 11*

A solution, containing 10 parts by weight of the compound corresponding to Formula 22 to 100 parts by volume of glycol monomethylether, is applied to paper and dried so that a paper coated with a photoconductive insulating layer is obtained. This can be given a negative electric charge from a corona discharge produced by a charging apparatus maintained at 6000–7000 volts. If the material is then exposed under a master for about 6 seconds to the light of a 100-watt incandescent lamp at a distance of about 25 cm. and dusted over with a resin powder pigmented with carbon black, a mirror image of the master is obtained. The finely divided resin adheres to the parts of the photoconductive coating not struck by light during the exposure. If paper or a plastic foil is then pressed on the powder image thus obtained, the image is transferred and a correct image is obtained on the paper or plastic foil. In the preparation of the correct image, an electric field may be applied to the paper or plastic foil so that the primary mirror-image powder reproduction is thereby transferred. If the transfer material is transparent, intermediate originals suitable for further reproduction are obtained. These are, for example, suitable for further reproduction on diazo paper.

*Example 12*

A solution of 10 parts by weight of the compound corresponding to Formula 23 in 100 parts by volume of glycol monomethylether is applied to paper and dried. The coated paper is negatively charged by a corona discharge. The photoelectrically conductive sheet is then exposed under a transparent master for 10 seconds to the light of a 125-watt high-pressure mercury vapor lamp and the exposed side is dusted over with a developer, e.g., that described in Example 1, so that an image corresponding to the master is obtained which is fixed by heating.

*Example 13*

Eight parts by weight of the compound corresponding to Formula 29 are dissolved in 100 parts by volume of glycol monomethylether and 20 parts by volume of dimethyl formamide, and the solution is applied to an aluminum foil. Further procedure is as described in Example 1, a latent electrostatic image being obtained with an exposure to a 125-watt high-pressure mercury vapor lamp at a distance of about 30 cm. It is made visible with a developer and then fixed, as previously described. The exposure time is about 1 second.

*Example 14*

A solution containing 2.5 parts by weight of poly-N-(carbazolyl-(9))-acrylic acid amide, corresponding to Formula 11, to 25 parts by volume of toluene and 12 parts by volume of methyl glycol is applied to a superficially hydrolyzed cellulose acetate foil and further procedure is as described in Example 1. The exposure time, if the material is exposed under a master to the light of a 125-watt high-pressure mercury vapor lamp at a distance of 30 cm., is about 5 seconds.

It will be obvious to those skilled in the art that many modifications may be made within the scope of the present invention without departing from the spirit thereof, and the invention includes all such modifications.

What is claimed is:

1. A photographic reproduction process which comprises exposing an electrostatically charged supported photoconductive insulating layer to light under a master and developing the resulting image with an electroscopic material, the photoconductive layer comprising a polymer having the formula

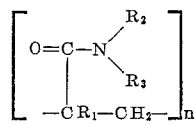

in which $R_1$ is selected from the group consisting of hydrogen and lower alkyl groups, $R_2$ is selected from the group consisting of hydrogen, aryl and heterocyclic groups, $R_3$ is selected from the group consisting of aryl and heterocyclic groups, $R_2$ and $R_3$ taken together with the amide nitrogen form a heterocyclic group, and $n$ is an integer greater than 1.

2. A process according to claim 1 in which the photoconductive layer contains at least one member of the group consisting of an optical sensitizer, an activator, a plasticizer, a resin and a pigment.

3. A photographic reproduction process which comprises exposing an electrostatically charged supported photoconductive insulating layer to light under a master and developing the resulting image with an electroscopic material, the photoconductive layer comprising a polymer having the formula

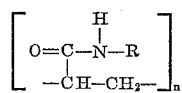

in which R is an aryl group and $n$ is an integer greater than 1.

4. A photographic reproduction process which comprises exposing an electrostatically charged supported photoconductive insulating layer to light under a master and developing the resulting image with an electroscopic material, the photoconductive layer comprising a polymer having the formula

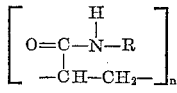

in which R is a heterocyclic group and $n$ is an integer greater than 1.

5. A photographic reproduction process which comprises exposing an electrostatically charged supported photoconductive insulating layer to light under a master and developing the resulting image with an electroscopic material, the photoconductive layer comprising a polymer having the formula

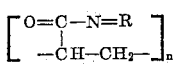

in which —N=R constitutes a heterocyclic group and $n$ is an integer greater than 1.

6. A photographic reproduction process which comprises exposing an electrostatically charged supported photoconductive insulating layer to light under a master and developing the resulting image with an electroscopic material, the photoconductive layer comprising a polymer having the formula

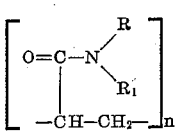

in which R and $R_1$ are aryl groups and $n$ is an integer greater than 1.

7. A photographic reproduction process which comprises exposing an electrostatically charged supported photoconductive insulating layer to light under a master and developing the resulting image with an electroscopic material, the photoconductive layer comprising a polymer having the formula

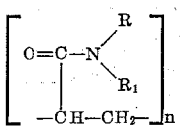

in which R and $R_1$ are heterocyclic groups and $n$ is an integer greater than 1.

8. A photographic reproduction process which comprises exposing an electrostatically charged supported photoconductive insulating layer to light under a master and developing the resulting image with an electroscopic material, the photoconductive layer comprising a polymer having the formula

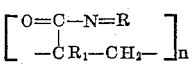

in which —N=R constitutes a heterocyclic group, $R_1$ is a lower alkyl group, and $n$ is an integer greater than 1.

9. A photographic reproduction process which comprises exposing an electrostatically charged supported photoconductive insulating layer to light under a master and developing the resulting image with an electroscopic material, the photoconductive layer comprising a polymer having the formula

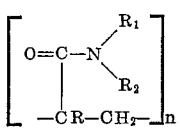

in which $R_1$ and $R_2$ are aryl groups, R is a lower alkyl group, and $n$ is an integer greater than 1.

10. A photographic reproduction process which comprises exposing an electrostatically charged supported photoconductive insulating layer to light under a master and developing the resulting image with an electroscopic material, the photoconductive layer comprising a polymer having the formula

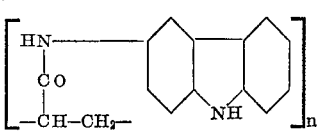

in which $n$ is an integer greater than 1.

11. A photographic reproduction process which comprises exposing an electrostatically charged supported photoconductive insulating layer to light under a master and developing the resulting image with an electroscopic material, the photoconductive layer comprising a polymer having the formula

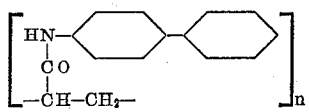

in which $n$ is an integer greater than 1.

12. A photographic reproducing process which comprises exposing an electrostatically charged supported photoconductive insulating layer to light under a master and developing the resulting image with an electroscopic material, the photoconductive layer comprising a polymer having the formula

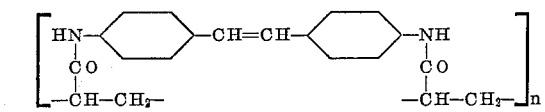

in which $n$ is an integer greater than 1.

13. A photographic reproduction process which comprises exposing an electrostatically charged supported photoconductive insulating layer to light under a master and developing the resulting image with an electroscopic material, the photoconductive layer comprising a polymer having the formula

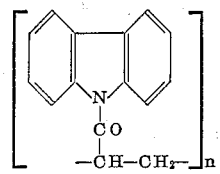

in which $n$ is an integer greater than 1.

14. A photographic reproduction process which comprises exposing an electrostatically charged supported photoconductive insulating layer to light under a master and developing the resulting image, with an electroscopic material, the photoconductive layer comprising a polymer having the formula

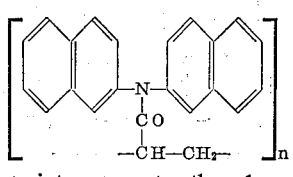

in which $n$ is an integer greater than 1.

15. A photographic reproduction process which comprises exposing an electrostatically charged supported photoconductive insulating layer to light under a master and developing the resulting image with an electroscopic material, the photoconductive layer comprising a polymer having the formula

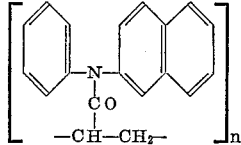

in which $n$ is an integer greater than 1.

16. A photographic reproduction process which comprises exposing an electrostatically charged supported photoconductive insulating layer to light under a master and developing the resulting image with an electroscopic material, the photoconductive layer comprising a polymer having the formula

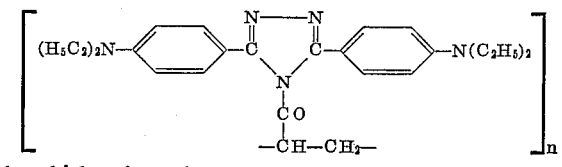

in which $n$ is an integer greater than 1.

17. A photographic reproduction process which comprises exposing an electrostatically charged supported photoconductive insulating layer to light under a master and developing the resulting image with an electroscopic material, the photoconductive layer comprising a polymer having the formula

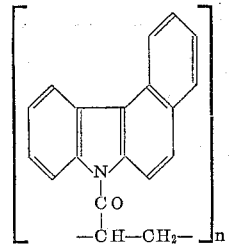

in which $n$ is an integer greater than 1.

18. A photographic reproduction process which comprises exposing an electrostatically charged supported photoconductive insulating layer to light under a master and developing the resulting image with an electroscopic material, the photoconductive layer comprising a polymer having the formula

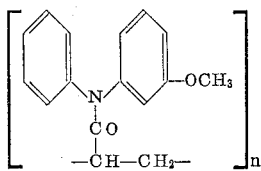

in which $n$ is an integer greater than 1.

19. A photographic reproduction process which comprises exposing an electrostatically charged supported photoconductive insulating layer to light under a master and developing the resulting image with an electroscopic material, the photoconductive layer comprising a polymer having the formula

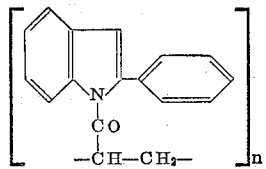

in which $n$ is an integer greater than 1.

20. A photographic reproduction process which comprises exposing an electrostatically charged supported photoconductive insulating layer to light under a master and developing the resulting image with an electroscopic material, the photoconductive layer comprising a polymer having the formula

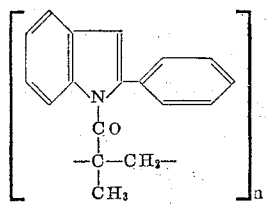

in which $n$ is an integer greater than 1.

21. An electrophotographic reproduction process which comprises exposing an electrostatically charged photoconductive insulating material to a pattern of light and developing the resulting image with an electroscopic material wherein said photoconductive insulating material comprises a polymer of an N-aryl acrylamide.

References Cited by the Examiner
UNITED STATES PATENTS

| | | | |
|---|---|---|---|
| 2,146,209 | 2/1939 | Graves | 260—89.7 |
| 2,288,197 | 6/1942 | Kranzlein et al. | 260—89.7 |
| 2,409,126 | 10/1946 | Kenyon et al. | 260—89.7 |
| 2,566,162 | 8/1951 | Caldwell | 260—89.7 |
| 2,643,958 | 6/1953 | Kleiner | 260—89.7 |
| 2,820,777 | 1/1958 | Suen et al. | 260—89.7 |
| 2,886,558 | 5/1959 | Friedlander | 260—89.7 |
| 2,954,291 | 9/1960 | Clark | 96—1 |
| 2,962,376 | 11/1960 | Schaffert | 96—1 |
| 2,976,294 | 3/1961 | Firestine | 260—88.3 |
| 3,070,442 | 12/1962 | Cohen | 96—115 |
| 3,073,699 | 1/1963 | Firestine | 96—115 |

J. TRAVIS BROWN, *Primary Examiner.*

MILTON STERMAN, *Examiner.*

J. E. ALIX, C. VAN HORN, *Assistant Examiners.*